DATA TRANSMISSION SYSTEMS

Filed Jan. 24, 1966 5 Sheets-Sheet 1

United States Patent Office 3,510,586

Patented May 5, 1970

3,510,586
DATA TRANSMISSION SYSTEMS

Esmond Philip Goodwin Wright, London, England, assignor to International Standard Electric Corporation, New York, N.Y., a corporation of Delaware Filed Jan. 24, 1966, Ser. No. 522,538
Claims priority, application Great Britain, Jan. 29, 1965, 4,032/65
Int. Cl. H04l 25/02
U.S. Cl. 178—69 7 Claims

ABSTRACT OF THE DISCLOSURE

A signalling system for telecommunications having a number of features arising out of the use of a separate data signalling channel. The data stream uses blocks of signals with acknowledgement signals and error detecting facilities. The use of duplicate signalling channels enables correct operation to continue when one channel gives wrong signals, or even when both channels give wrong signals, but the correct signals can be deduced from the received information. Special operational procedures are described with regard to certain signals (i.e. Clear-Forward Signal). Also described are facilities for signals of different priorities, test signals and administrative signals.

This invention relates to signalling systems and is particularly applicable to systems in which a signalling circuit having error control facilities serves a number of message circuits.

The signalling circuit comprises independent go and return channels over which continuous data streams are transmitted. As the transfer time for some at least of the signals needs to be kept low it is a necessary requirement that the error control should avoid delay as far as possible.

The error control needs to make provision for short interference on the line, for failure in the terminal equipment and for long term interruption in the line. As a consequence the error control needs to detect the presence of errors and to find some way or other of carrying out the transfer of the signals which have been distorted by interference. The error control should be capable of bringing into service an appropriate stand-by service; it should also be capable of restoring the normal service when conditions allow. Errors in the terminal equipment need to be identified by the error control so that automatic or manual means may be used to replace any unserviceable equipment.

It will be appreciated that signals associated with the message channels will appear at random times in both directions of transmission of the signalling channel. Furthermore, any changes to or from standby operation need to be co-ordinated between the two terminals.

The error control is assumed to include known techniques for addition of check elements which can enable a very large percentage of all errors to be detected. It also assumes the use of backward acknowledgement signals which identify the forward signals which have been accepted and therefore do not need to be retransmitted.

According to the invention there is provided a signalling system for a telecommunication network. Signalling is effected by a series of digital signals of fixed length transmitted in both directions in synchronous operation over independent signalling channels, including means for determining the absence of operational signals awaiting transmission over the signalling circuit and means for transmitting special test signals over the signalling circuit in the absence of operational signals.

Correct acknowledgement of these test signals provides provides supervision that the signalling circuit is operating correctly. This supervision is maintained during the presence and absence of operational signals.

The use of a data stream for signalling purposes enables procedures such as requiring certain signals (e.g. Clear-Forward Signal) to be received more than once before a response is given. A false operation would then depend on two identical errors. Also it is possible to avoid misoperation by disregarding signals which are inappropriate (e.g. Release-Guard Signal received before Clear-Forward Signal is sent).

According to another feature of the invention, counting or timing devices are used to determine when a signal channel is deemed unserviceable in order to introduce standby arrangements. As there may be no communication at such time between the terminals both need to determine the unserviceable state. After the standby arrangements are introduced the test signals are continued in order to determine when the signal channel is again serviceable so that normal service can be resumed.

If each of the signal positions in the data stream is used for operational or test signals and each is acknowledged individually it follows that both "go" and "return" channels would be fully occupied by the signals transmitted from one terminal. It is another feature of the invention that there are fewer backward than forward signals.

The above and other features of the invention are now described, by way of example only, with reference to the accompanying drawings, in which.

Figure 1:
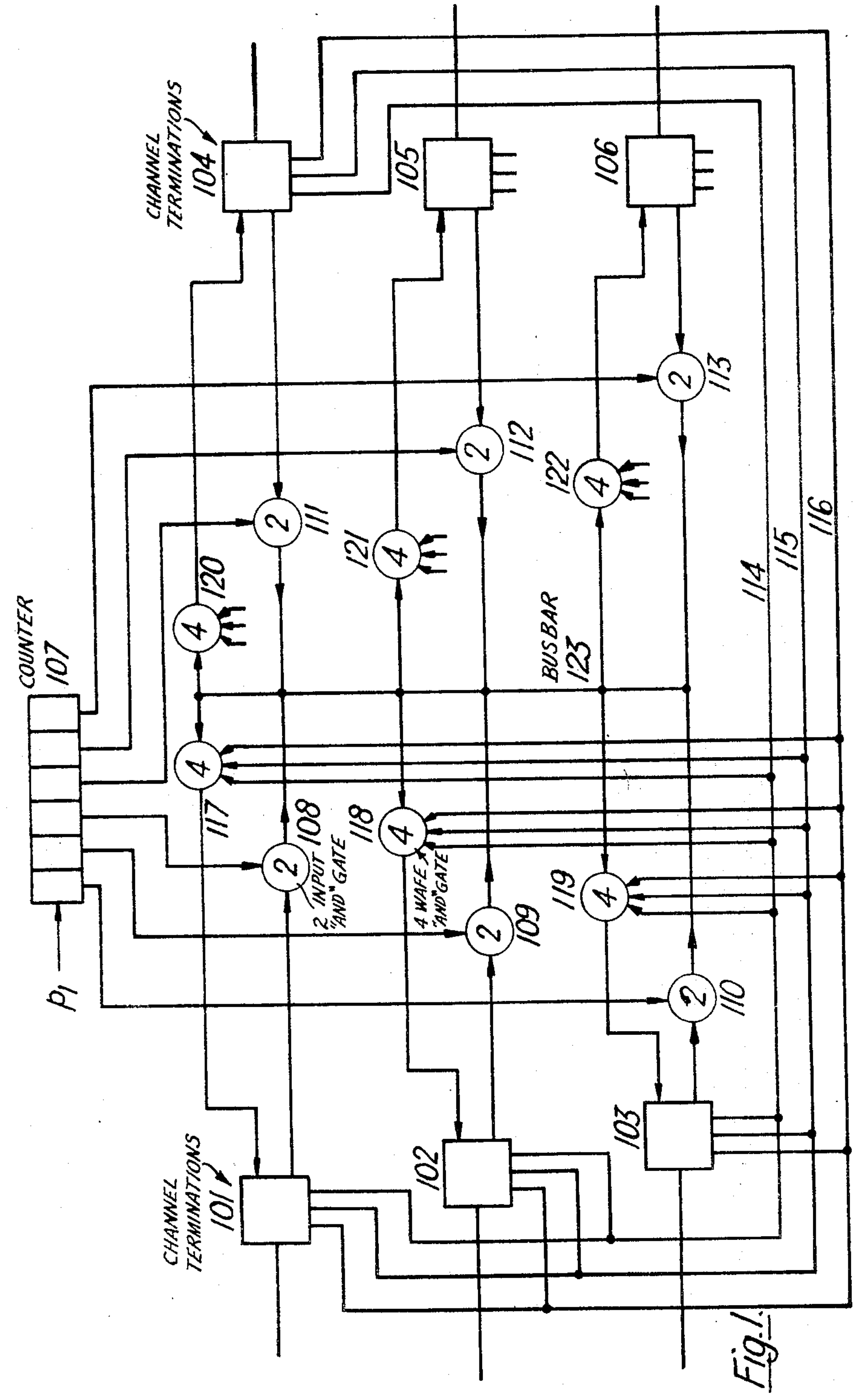
FIG. 1 illustrates the transfer of signals between several common signalling channels terminating in the same center.
Figure 2:
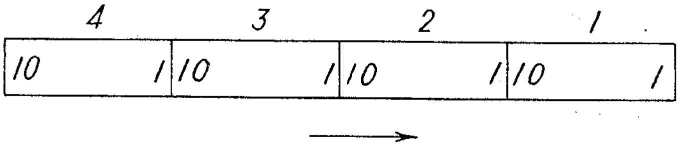
FIGS. 2 and 3 illustrate the nature of a block of signals.
Figure 3:
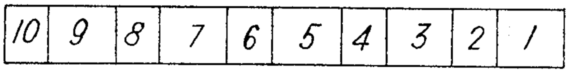
Figure 9:
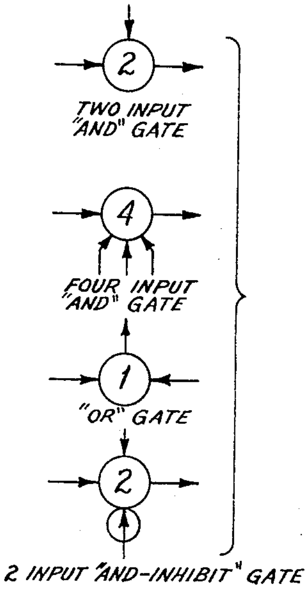
FIG. 9 is a "dictionary" figure showing representative gates.

The reference characters 101–106 represent the terminations of six common signalling channels. These terminations are scanned in turn by the counter 107 which causes one or other of the gates 108 to 113 to conduct and by another control (not shown) enables the associated terminals 101 to 106 to apply potentials to the three conductors 114–116 whereby the appropriate one of the gates 117-122 is also caused to conduct so that the busbar 123 provides a path for the transfer of signals between any pair of terminations.

As an example, termination 104 having a signal for 101 awaits the arrival of a pulse from 107 which enables 104 to apply the appropriate potentials to cause the gate 117 to conduct. By the use of a shift register technique the signal can be transferred in serial form by a series of pulses $p_2$ which are related to the pulses $p_1$ used to drive 107.

Figure 4:
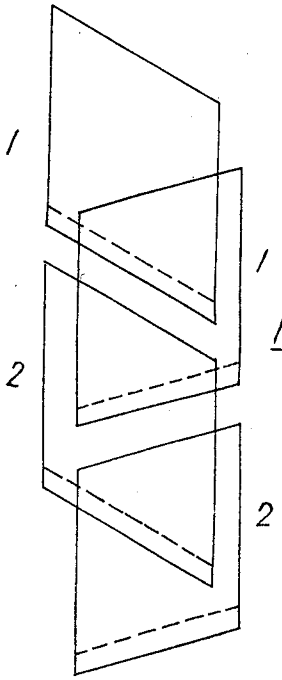
FIG. 4 is a timing diagram showing the relationship between blocks of signals in both directions on one signalling channel.

The appropriate acknowledgement signal to be sent is made available after a block is received and as shown in FIG. 4 it is advisable to insert the acknowledgement signal quickly. The actual position will depend on the propagation time. In the diagram two complete blocks are shown in each direction. The dotted lines are the two acknowledgment signals in each direction.

It should be understood that if the acknowledgement signal for block 1 is received while block 2 is in process it would be possible to include any signal which needs to be retransmitted in block 2. Should the request be for the complete block to be transmitted only the operational signals would be selected and it is possible that there might be so many that their retransmission extends into a subsequent block.

All the signals to be transmitted pass through a buffer store in which they are held until the acknowledgement has been received. For the example quoted the buffer store needs to include a section equal to the contents of two blocks so that reference can be made to the appropriate signals when the acknowledgement signal arrives. A repeated signal would exchange its original identity for a new identity on retransmission so that if there is a further application for retransmission it can be related to the second rather than the first transmission.

Rapidity of operation is also achieved by the use of a synchronous signal mode of operation. Element and signal synchronization will be maintained by special signals to be described later.

With a synchronous signal system there will be two sources of delay to signals. Every signal will be subject to a delay while awaiting the next emission start and in addition some signals will also be delayed awaiting the completion of previous signals. This would appear at first sight to involve more delay than an asynchronous system which only suffers the second type of delay. However, a synchronous system has no need to initiate each signal with a "start" pattern and as a consequence the traffic delay is reduced.

A more important feature of the synchronous arrangement is its improved ability to handle signals of different precedence. Because greater speed can only be achieved by increased expense it is advantageous to allow the average delay to exceed that tolerable for the most urgent signals.

The manner in which the system can be employed is to assign the following signal procedures:

(1) Urgent operational signals.
(2) Ordinary operational signals.
(3) Routine administration signals.
(4) Signals for test and synchronization.

Figure 5:
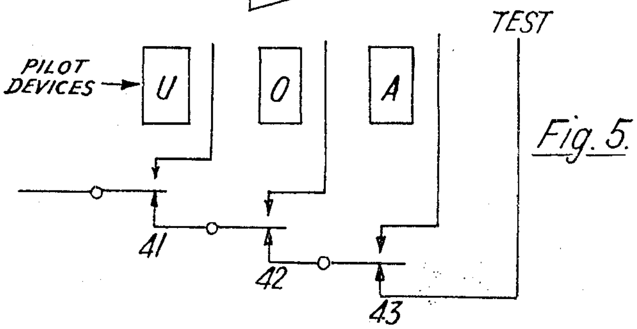
FIG. 5 illustrates diagrammatically the equipment for selecting signals of different precedence awaiting transmission.

FIG. 5 shows in outline the means by which the appropriate signal would be selected. Three pilot devices U, O and A indicate the presence of waiting signals in the "Urgent," "Ordinary" and "Administrative" signal categories. The presence of an urgent signal would cause the buffer store reading control to withdraw a signal from the "urgent" section via switch 41. In a similar way the store would be directed to other sections. If no signal is waiting a test signal would be transmitted via switches 41, 42 and 43.

Each section of the buffer store is designed with cyclic addressing facilities both for writing and reading so that new signals are inserted in sequence and, in due course, the signals will be read out in the same order. When both writing and reading addressing systems are holding the same address there is no signal waiting and the pilot, such as U is unoperated. As soon as a signal is inserted and the address systems hold different addresses the appropriate pilot operates to indicate a waiting signal.

The process is described later in relation to FIG. 6.

The transmitted signal on the line carries no indication of its precedence other than the function represented.

The speed advantage of the synchronous mode of operation will be apparent from the fact that although all signals suffer the systematic delay the urgent signals are only subject to traffic delay consequent upon other urgent signals. In a similar way the ordinary signals would not be delayed due to the transmission of administrative or test signals.

With the synchronous operation all the signal emission times are used for one type of signal or another and the test signals can be very frequent indeed. These test signals can comprise patterns which help synchronization and also check the operation of all the diverse parts of the terminal equipment. At least two different test signal patterns would be used to help synchronization and error analysis.

Figure 6:
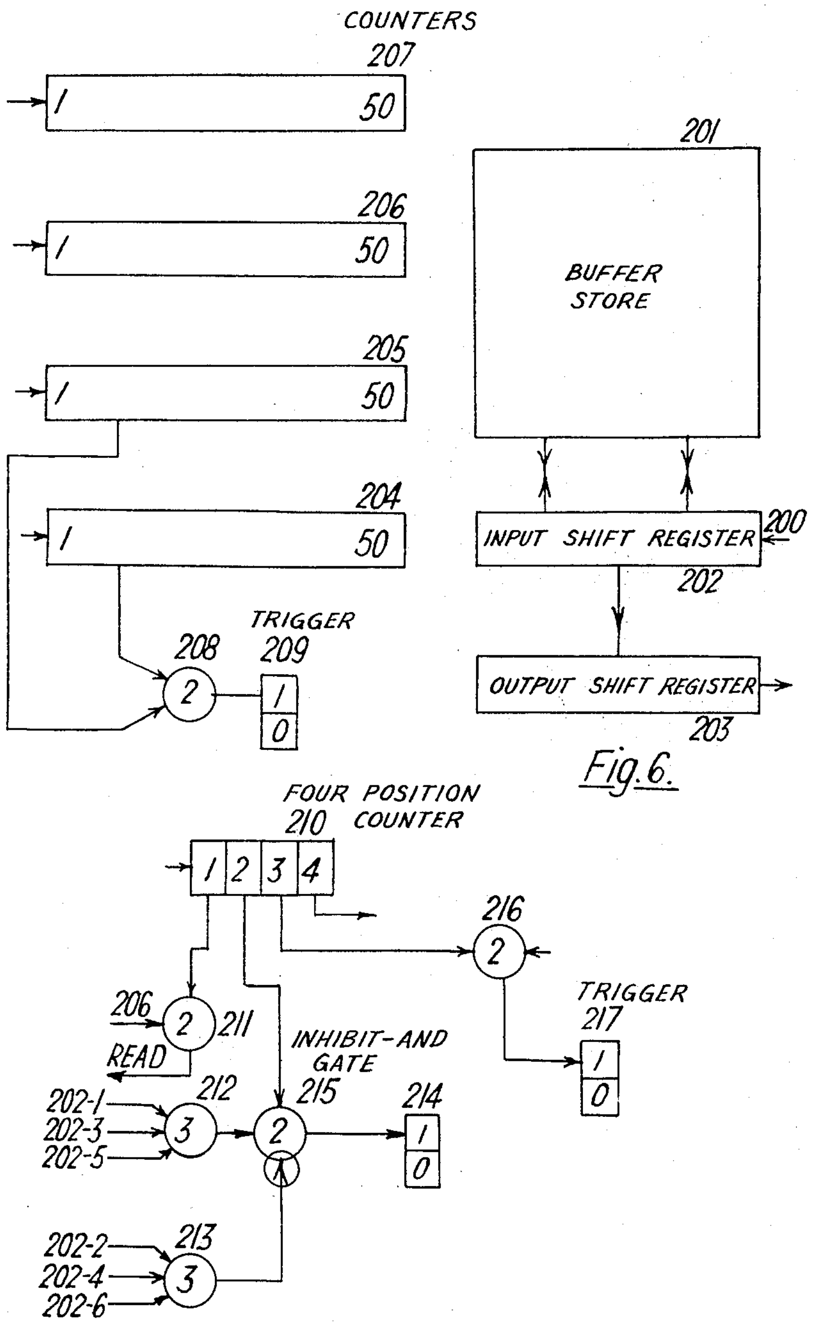
FIG. 6 illustrates part of a terminal such as 101 in FIG. 1.

FIG. 6 illustrates part of a terminal such as 101 and includes a buffer store 201, an input shift register 202 and an output shift register 203 through which signals are transmitted over the common signal channel. Counters 204–207 are used for the processing of the signals in the buffer store as described later.

The signals received via the busbar 123 (FIG. 1) and the conductor 200 arrive in randomly spaced intervals whereas the signals emitted via the shift register 203 are withdrawn at fixed intervals to feed the signalling channel which operates in a synchronous mode.

The buffer 201 stores one or more waiting signals.

The counter 205 distributes the incoming signals in cyclic order of 50 locations. The counter 204 reads out these locations in the same cyclic order.

A series of gates such as 208 cause the output 1 associated with the trigger 209 to conduct when the counter advances and finds no further signals waiting to be transmitted. The fact that 209–1 is conducting causes a predetermined test signal to be gated into the shift register 203 and subsequently to be emitted to line. It will be appreciated that 209 may be coupled to a counter in such a way that a plurality of different test signals may be emitted in fixed cyclic order according to the position of the counter. As soon as a further incoming signal is received it is passed into the buffer store. Every signal accepted in this way causes the counter 205 to make one step forward. The stepping circuit for 205 is also caused to restore the trigger 209 and thereby permit the sending counter to advance and allow the waiting signal to be read from 201 and passed to the shift register 203.

The buffer 201 can be a ferrite store with normal addressing facilities controlled by the counters 204 and 205.

As already explained the signals are withdrawn from the shift register 203 at times and rates in synchronism with the clock (not shown) driving the modulator. There are consequently certain predetermined times for refilling 203 and the store 201 must be maintained available at these times to allow the necessary reading operation. Whereas the extraction of the signal from 203 may need 100 ms. the filling of 202 need only occupy a small fraction of this time. To ensure the proper operation of the buffer 201 the acceptance of new signals is inhibited for a brief period in the sending cycle of each line signal to ensure that the next signal is available in 203 at the appropriate time. Each transmitted block terminates with a checking signal unit which is not derived from 203 but provides time for refilling 203.

The buffer store 201 is also used to maintain a record of the signals which have been transmitted so that they may be retransmitted if there is uncertainty about the correct reception of the previous transmission. This is achieved by transferring the signals read out of 201 into 203 back into 201 in a location indicated by the counter 207 which is arranged like the counter 205 to make one step forward after each signal insertion. The counter 206 is used subsequently for reading out these signals.

It has been mentioned that each signal transmitted included some checking bits which enable the receiving termination to decide whether or not the signal should be accepted. After a predetermined number of signals have been received a backward signal is sent to indicate which signals do not need to be retransmitted. When this check signal is received either of two procedures are adopted. If all the signals were correctly received the counter 206 is advanced to read out the predetermined number of signals but not to pass them into the shift register 203 for transmission. If the backward signal is faulty or asks for a complete retransmission then the read out takes the place of that of the counter 204, each signal being passed to 203 for retransmission. Certain of the signals stored under the control of 207 will be test signals and these need not be retransmitted. It is necessary that the test signals should be recognized and the label preceding the functional part of the signal can be used both at the receiving and the transmitting station for this purpose.

To allow the test signals to be discarded the reading of the store 201, under the control of 206, causes each signal in turn to pass into 202. The register 202 is associated with the necessary decoding gating (described below) to allow the test label or labels to be identified and cause the operation of a trigger which inhibits the transfer of the signal from 202 to 203 but causes 206 to advance and read the next signal. When a signal, other than a test signal, is received in 202 it is transferred to 203 and also rewritten in the store under the control of counter 207 in the same manner as all other transmitted signals.

The decoding gating associated with the register 202 includes a four position counter 210. When 210 is stepped to 210–1 it opens a gate 211 in conjunction with the appropriate pulse from the cyclic counter 206 and thereby initiates read-out from the store 201. In time position 210–2 the six bits making up the signal unit label are applied from 202 in two groups of three to two gates 212, 213. For example bits 202–1, 202–3 and 202–5 could all be required to be "1's" while bits 202–2, 202–4 and 202–6 must all be "0's" to indicate a test signal. If these conditions are met gate 212 will open and, in conjunction with 210–2 at gate 215 will set trigger 214 to 214–1. At the same time the three "0's" applied to 213 are arranged to prevent inhibition of gate 215. Note that if only two "1's" are applied to gate 212, or if a "1" is applied to 213, gate 215 will not open, i.e. the signal in 202 is not a test signal. If this happens then 214 will remain at 214–0 and the output from this together with 210–3 opens gate 216 and sets trigger 217 to 217–1. Thus it can be seen that either 214–1 or 217–1 will appear depending on whether or not the signal in 202 is a test signal.

Finally in time position 210–4 the contents of 202 are disposed of according to the relative conditions of 214 and 217. If 214–1 appears it means a test signal read out from 202 must be destroyed and if 217–1 appears it means that the contents of 202 must be transmitted over the line and simultaneously re-written in 201 in case further retransmission is required. The next signal can then be read from 201 to 202.

Figure 7:
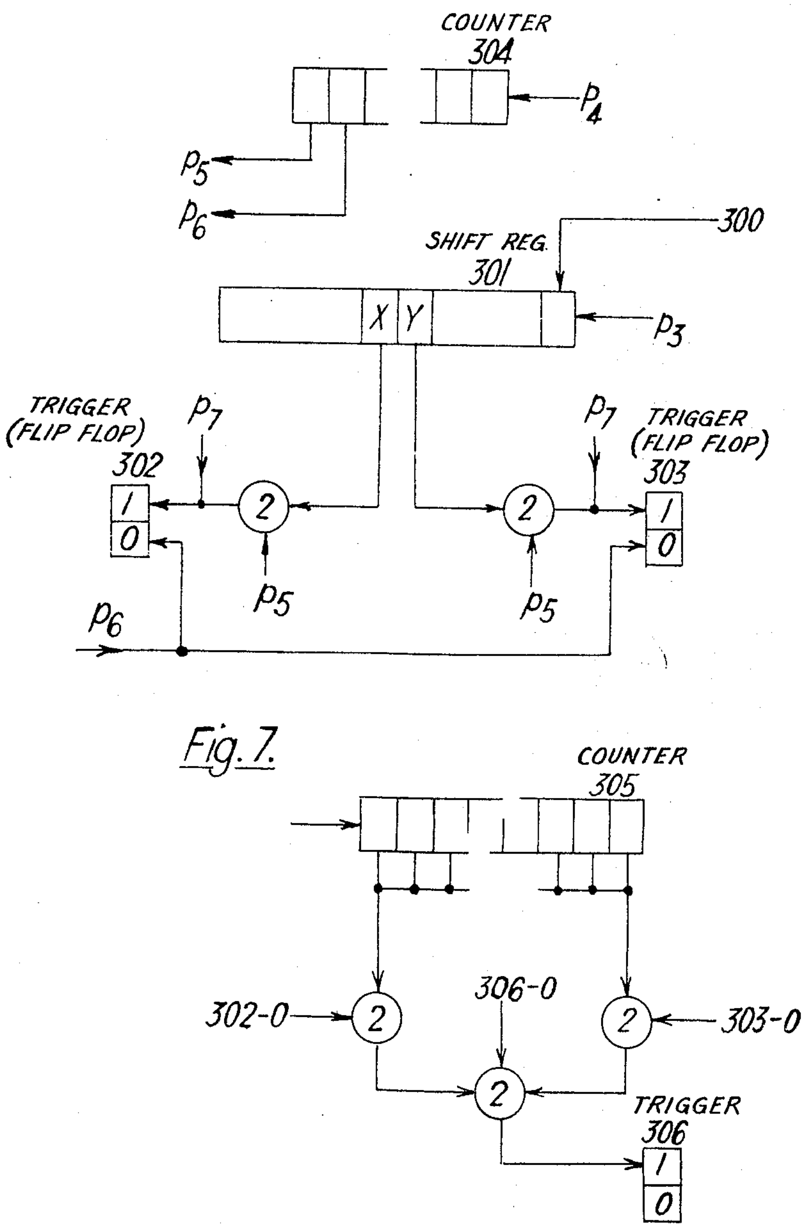
FIG. 7 illustrates another part of the terminal 101 in FIG. 1.

FIG. 7 illustrates another part of the termination 101 of FIG. 1. The incoming signals from the common signalling circuit are passed over the conductor 300 to the shift register 301 which steps from pulses $p_3$ which are derived by the demodulator to maintain element synchronization.

The error-decoding unit also uses these pulses to obtain signal (word) synchronization. With each signal received a pulse $p_4$ from the error detecting unit causes the counter 304 to make one step and after a predetermined number of steps the counter 304 indicates the backward check signal is then present in the shift register 301. It is assumed that the contents of the check signal is contained in the elements X and Y which are transferred to triggers 302 and 303 before the signal is removed from 301.

As an example the following combinations may have the significance shown.

302–0 and 303–0 conducting—all signals correct
302–1 and 303–0 conducting—repeat first half of signals
302–0 and 303–1 conducting—repeat second half of signals
302–1 and 303–1 conducting—repeat all signals.

The triggers 302 and 303 are arranged to be restored by $p_6$ on the reception of the signal preceding the next check character. If there are no test signals and the whole block needs to be retransmitted it is possible that the process is not complete when 303 is restored. An extra trigger (not shown) is therefore used, being operated by 303–1 and restored by the pulse $p_5$.

The counter 305 steps in phase with the counter 206 to allow the trigger 306 to respond to the signal $p_4$ which do not need to be retransmitted as indicated by the outputs 302–0 and 303–0. When 306–1 is conducting, the signals read out of 201 are destroyed like test signals without being transmitted.

In the event that the error-checking unit finds that the checking unit is wrong a pulse on $p_7$ causes both 302–1 and 303–1 to conduct regardless of the condition of the bits X and Y. Each time a signal is destroyed 306 is restored by a pulse coincident with that stepping the counter 305.

It will be appreciated that the check signal may employ more digits and make a more detailed indication of the signals needing retransmission.

In most cases the retransmission of signals will be completed before the next backward checking signal arrives. As soon as the counter 206 has processed all the signals controlled, the sequence of signals will be continued under the control of the counter 204. It will be noted that it would be quite exceptional for a block to be retransmitted in the same form as the previous transmission, usually some signals will have been accepted and in most cases a number of test signals will have been removed.

The transmission of test signals serves the purpose of assisting the receiving termination to maintain bit and signal unit synchronization. To this end the test signals are advisably rich in transitions between 0 and 1 potentials. A clear distinction between the label and the function part of the signal also assists with the signal unit synchronization.

The test signals are also fundamental for the supervision of the operation of the common signalling channel regardless of the presence of operational signals. As a consequence failure due to the line or terminal apparatus may sometimes be corrected before the operational signals are disturbed. Intermittent line interruptions can be overcome by the process of signal unit error detection and retransmission. However, in the case of longer interruption in the line or equipment failure, it may be essential to introduce standby plant as a temporary measure. When such failures occur, it is likely that communication between the two centers will be interrupted but nevertheless it is essential that the introduction of standby operation should take place at substantially the same moment at each termination. It is also necessary to revert to normal operation as soon as possible and once again the switch back should be co-ordinated at the two terminations.

The procedure must also provide for the case in which only one direction of operation fails.

Figure 8:
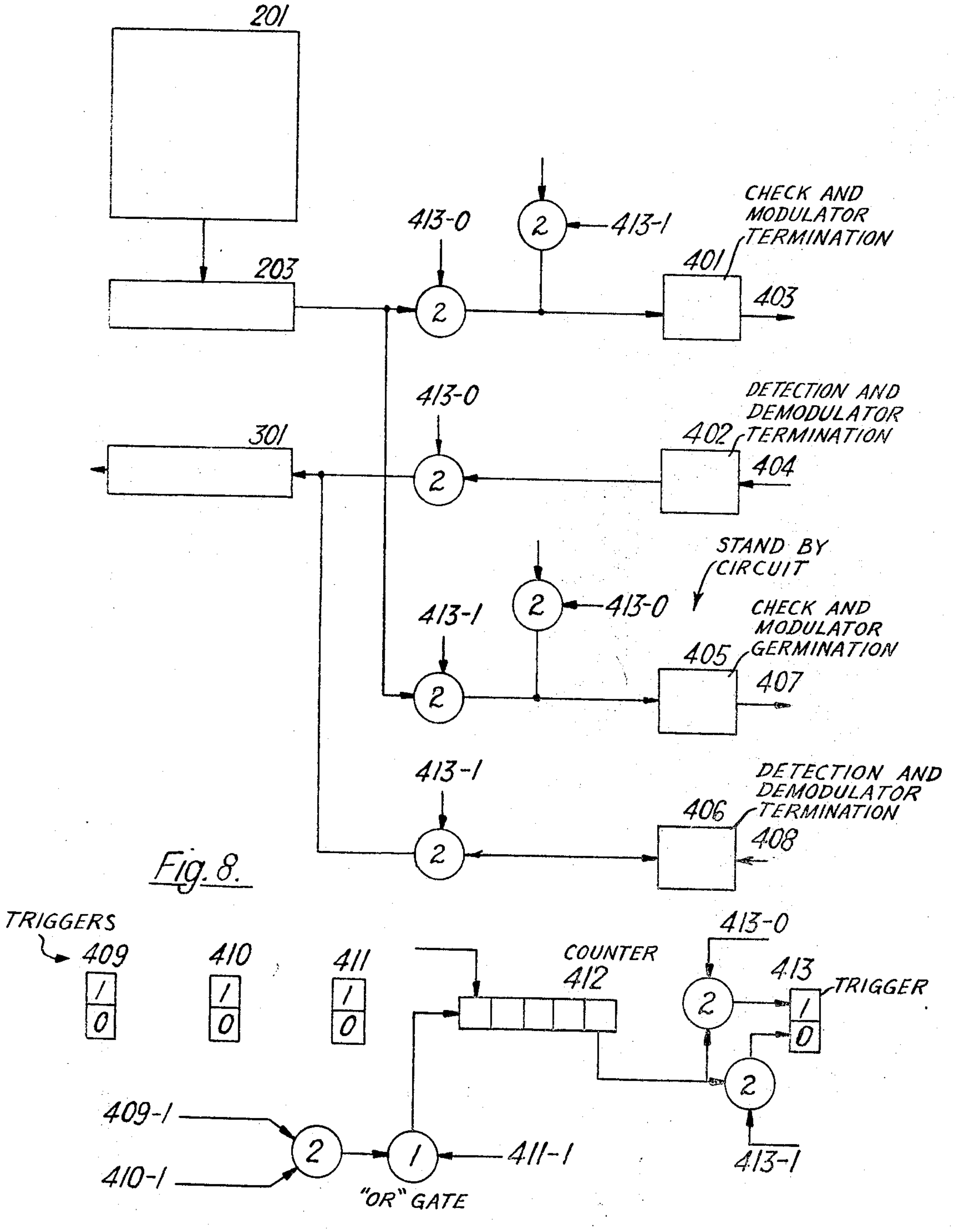
FIG. 8 illustrates a system with standby or duplicate transmission facilities.

FIG. 8 illustrates a normal common signalling channel 403 and 404 with a check and modulator termination 401 and a detection and demodulator termination 402. The corresponding standby circuit has corresponding units 405–408.

The marshalling of signals for emission is carried out in the buffer 201 and the shift register 203 as previously described. The received signals are processed into the shift register 301 from where they are transferred to stores associated with different speech circuits. The triggers 409–411 are provided in order to record the quality of service and operate with the counter 412 to decide when the failure has persisted sufficiently long to introduce the standby facilities. The counter is therefore designed to take a predetermined number of steps depending upon blocks of signals in unacceptable form after which the trigger 413 is operated to cause the change over by disabling the normal gates and acivating other gates whereby the shift registers 203 and 301 are transferred from the normal to the standby facility. After the transfer a succession of test signals are emitted over the faulty circuit and the stepping of the counter 412 is changed to count correct blocks so that after a predetermined number of correct blocks the service can be automatically or manually restored to normal.

The triggers 409 and 410 may be operated like the triggers 302 and 303 by the X and Y bits in the received check signal. Suitable gating can be provided whereby the triggers 409 and 410 may also be operated from the X and Y bits emitted from 401.

The trigger 411 may be operated from 402 as a consequence of the fact that the checking signal itself fails to check correctly.

It will be appreciated that if the channel 403 fails, the condition will be indicated by the check signals on 404. On the other hand if 404 fails all or most of the incoming signals will be rejected by 402 and this will be reflected in the check signal unit emitted by 401. The counter 412 can be designed to step in several ways such as due to the operation of 411 or the joint operation of 409 and 410. The counter may be restored to normal by any continuation of forward and backward block that has no error or only a small number of errors.

One means of trying to keep the two counters in phase is to include a bit in the check signal to indicate whether the counter at the sending end is stepping or not, but any error relating to this bit during transmission would lead to a wrong indication.

It should be understood that although FIG. 8 illustrates only one termination of the common signalling channel the same provision is needed at both ends.

Furthermore it should be understood that although not shown the standby circuit will need controls such as 409–413 in order that the performance of the standby channel may be supervised.

The processing of signals prior to transmission and subsequent to reception is preferably carried out electronically in order to take advantage of the higher operating speeds which are possible.

It is well known that the logical steps which are necessary can be effected by wired logic or the use of a program. The wired logic sometimes has the advantage that processing in different areas may be simultaneous whereas a program tends to lead to a succession of discrete steps.

One advantage of the use of a program is the fact that each instruction can be completed or interrupted at some suitable point to allow some other sequence to proceed. In the case of a complex of common signalling channels it is natural that the modulation rate should be similar on the two channels of each circuit. This can conveniently be achieved by a master and slave assignment but inevitably there must be master and slaves of different signalling circuits at the same place. There are obvious difficulties in planning that signals from other centers will continue to arrive in any fixed sequence.

It will be appreciated that such timing variations can be avoided by assigning programs or sub-frequencies to each common signalling circuit. The interchange of signals between these signalling circuits can be directed by another program which is organized to check the availability of the terminations of different signalling circuits to transfer signals. Such programs are commonly used in conjunction with digital computers.

What I claim is:

1. A signalling system for telecommunication network in which signalling is effected by a series of digital signal units transmitted in both directions in synchronous operation over independent signalling channels, said system including means for determining the absence of operational signals awaiting transmission over either of said signalling channels, means for transmitting special test signal units over either of said signalling channels in the absence of operational signal units, means for sending said test signals in a forward direction, means responsive to the test signals for returning acknowledging signals in a reverse direction, storage means for storing signal units and special test signals, and means for retransmitting selective signal units only from the storage means.

2. A system according to claim 1 including means for rejecting test signal units for retransmission.

3. A data transmission system for a telecommunication network in which signalling is effected by a series of digital signal units transmitted in both directions of synchronous operation over independent signalling channels, said system including means for determining the absence of operational signals awaiting transmission over either signalling channel, means for transmitting special test signal units over either of said signalling channels in the absence of operational signal units, means for sending said test signals in a forward direction, means responsive to the test signals for returning acknowledging signals in a reversed direction, said system further including alternative signalling channels, means for detecting the signal units which are incorrectly received, and means responsive to the signals unit incorrectly received for transferring signal arrangements from one signalling channel to one of said alternative signalling channels.

4. A system according to claim 3 including means for continuously transmitting test signals over a signalling channel not then engaged in transmitting operational signal units.

5. A digital transmission system for telecommunication networks in which signalling is effected by a series of digital signal units transmitted in both directions in synchronous operation over independent signalling channels, said system including means for determining the absence of operational signals awaiting transmission over either of said signalling channels, means for transmitting special test signal units over either of said signalling channels in the absence of operational signal units, means for sending said test signals in a forward direction, means responsive to the test signals for returning acknowledgement signals in a reverse direction, and said test signals comprising different patterns of signals transmitted at different times.

6. A signalling system according to claim 5 and means responsive to a check signal unit for indicating acceptance of a plurality of signal units received from a distant terminal.

7. A signalling system according to claim 6 and means responsive to the reception of a check signal unit for causing the retransmission of certain signal units but not the retransmission of any test signal units.

References Cited

UNITED STATES PATENTS

| | | | |
|---|---|---|---|
| 2,653,996 | 9/1953 | Wright | 178—69 |
| 2,870,254 | 1/1959 | Slayton et al. | 178—69 |
| 3,272,921 | 9/1966 | Van Duuren | 178—69 |
| 3,349,374 | 10/1967 | Gabrielson et al. | 178—69 |
| 3,381,272 | 4/1968 | Pasini | 178—23 |
| 3,388,378 | 6/1968 | Steereck et al. | 178—23.1 |

THOMAS A. ROBINSON, Primary Examiner

U.S. Cl. X.R.

178—23, 58; 340—147